(12) United States Patent  
Kim et al.

(10) Patent No.: US 11,522,224 B2  
(45) Date of Patent: Dec. 6, 2022

(54) ELECTROLYTE FOR LITHIUM SECONDARY BATTERY AND LITHIUM SECONDARY BATTERY INCLUDING SAME

(71) Applicant: LG Chem, Ltd., Seoul (KR)

(72) Inventors: Hyun Seung Kim, Daejeon (KR); Chui Haeng Lee, Daejeon (KR); Yu Ha An, Daejeon (KR); Jeong Woo Oh, Daejeon (KR)

(73) Assignee: LG Energy Solution, Ltd.

( * ) Notice: Subject to any disclaimer, the term of this patent is extended or adjusted under 35 U.S.C. 154(b) by 365 days.

(21) Appl. No.: 16/771,327

(22) PCT Filed: Jun. 11, 2019

(86) PCT No.: PCT/KR2019/007005  
§ 371 (c)(1),  
(2) Date: Jun. 10, 2020

(87) PCT Pub. No.: WO2019/240465  
PCT Pub. Date: Dec. 19, 2019

(65) Prior Publication Data  
US 2020/0343588 A1    Oct. 29, 2020

(30) Foreign Application Priority Data

Jun. 12, 2018 (KR) .......................... 10-2018-0067431

(51) Int. Cl.  
*H01M 10/0567* (2010.01)  
*H01M 10/0525* (2010.01)  
(Continued)

(52) U.S. Cl.  
CPC ... *H01M 10/0567* (2013.01); *H01M 10/0525* (2013.01); *H01M 10/0568* (2013.01); *H01M 10/0569* (2013.01); *H01M 2300/0037* (2013.01)

(58) Field of Classification Search  
CPC ......... H01M 10/0567; H01M 10/0525; H01M 10/0568; H01M 10/0569; H01M 2300/0037  
See application file for complete search history.

(56) References Cited

U.S. PATENT DOCUMENTS

2008/0102377 A1   5/2008  Abe et al.  
2014/0023770 A1   1/2014  Holscher et al.  
(Continued)

FOREIGN PATENT DOCUMENTS

JP         4089235 B2       5/2008  
JP         2008186770   *   8/2008  ............ H01M 10/05  
(Continued)

OTHER PUBLICATIONS

Machine Translation of Ishii (Year: 2008).*  
(Continued)

*Primary Examiner* — Matthew T Martin  
*Assistant Examiner* — Ankith R Sripathi  
(74) *Attorney, Agent, or Firm* — Lerner, David, Littenberg, Krumholz & Mentlik, LLP

(57) ABSTRACT

The present invention relates to an electrolyte for a lithium secondary battery and a lithium secondary battery including the same, the electrolyte including a lithium salt, an additive containing a compound represented by Formula 1, and an organic solvent.

10 Claims, 1 Drawing Sheet

(51) Int. Cl.
    *H01M 10/0568* (2010.01)
    *H01M 10/0569* (2010.01)

(56) References Cited

U.S. PATENT DOCUMENTS

| | | | |
|---|---|---|---|
| 2014/0134501 A1 | 5/2014 | Li et al. | |
| 2015/0104716 A1 | 4/2015 | Kang et al. | |
| 2017/0210764 A1 | 7/2017 | Maeda et al. | |
| 2018/0358655 A1 | 12/2018 | Kono et al. | |
| 2020/0161707 A1 * | 5/2020 | Kawasumi | H01M 4/587 |
| 2020/0365946 A1 * | 11/2020 | Kim | H01M 10/0569 |

FOREIGN PATENT DOCUMENTS

| | | | |
|---|---|---|---|
| JP | 5595294 B2 | 9/2014 | |
| JP | 2016131059 A | 7/2016 | |
| JP | 2016192357 A | 11/2016 | |
| JP | 6954354 B2 * | 10/2021 | H01M 10/0525 |
| KR | 20070089958 A | 9/2007 | |
| KR | 20150042091 A | 4/2015 | |
| KR | 20150079078 A | 7/2015 | |
| KR | 20150114460 A | 10/2015 | |
| KR | 102294866 * | 10/2019 | H01M 10/0569 |
| WO | 2016017362 A1 | 2/2016 | |

OTHER PUBLICATIONS

Aleksandra Palasz et al: "Application of dimedone enamines as dienophiles: stereoselective synthesis of amino enols of fused uracils containing a sugar moiety by hetero-Diels-Alder reactions of barbituric acid 5-ylidene alditols with dimedone enamines", Tetrahedron, vol. 71, No. 47, Nov. 1, 2015 (Nov. 1, 2015), pp. 8911-8924, XP055756155.
European Search Report for Application No. EP19820409.1, dated Dec. 15, 2020, 5 pages.
Khlebnikova, T.S. et al: "Regioselective reduction of 2-perfluoroalkanoylcyclohexane-1,3-diones and their enamino derivatives", Russian Journal of General Chemistry, Nauka/Interperiodica, Mo, vol. 81, No. 4, May 22, 2011 (May 22, 2011), pp. 672-679, XP019907100.
Bryson T. A. et al., "Enamine Chemistry I. Carbanion Alkylations", Tetrahedron Letters, Jan. 1, 1974, No. 45, pp. 3963-3966, XP055821665.
Chemical Abstract Compounds. STN express, 3 pages, RN 16179-67-2 (Entered STN: 1984. 11. 16), RN 13297-58-0 (Entered STN: 1984. 11. 16), RN 16179-65-0 (Entered STN: 1984. 11. 16), RN 13358-76-4 (Entered STN: 1984. 11. 16), RN 19805-73-3 (Entered STN: 1984. 11. 16), RN 13358-81-1 (Entered STN: 1984. 11. 16).
International Search Report from Application No. PCT/KR2019/007005 dated Sep. 20, 2019, 2 pages.

* cited by examiner

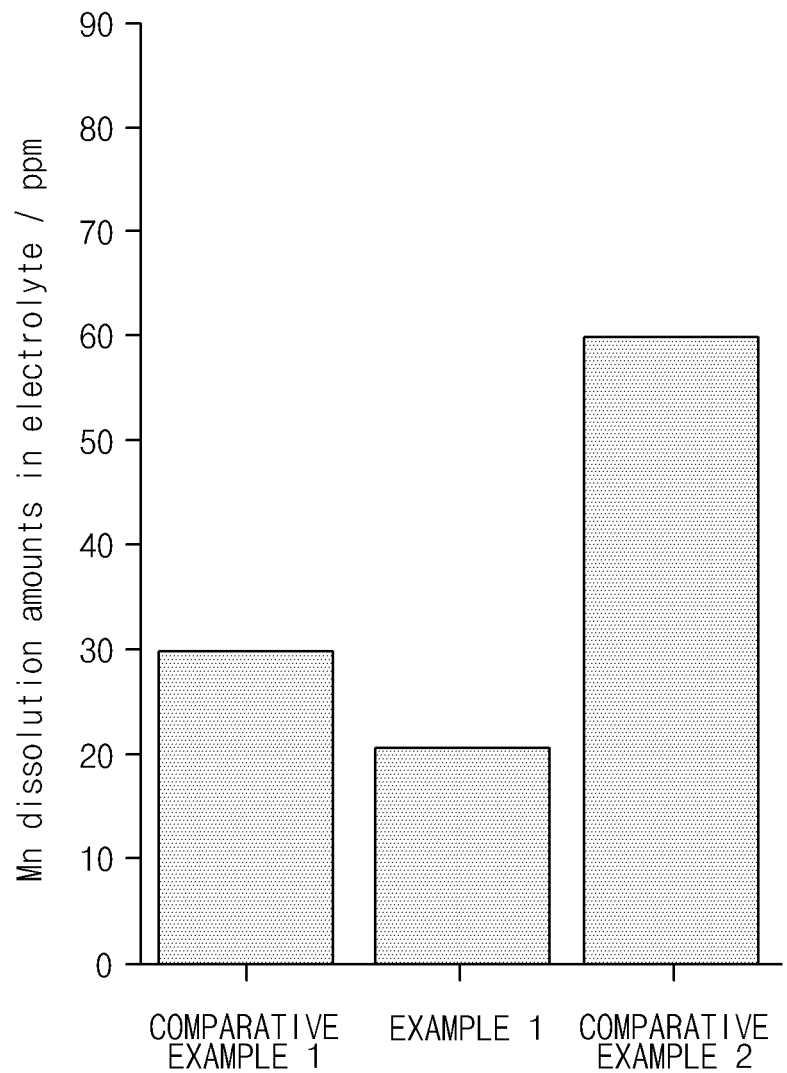

ELECTROLYTE FOR LITHIUM SECONDARY BATTERY AND LITHIUM SECONDARY BATTERY INCLUDING SAME

CROSS-REFERENCE TO RELATED APPLICATIONS

The present application is a national phase entry under 35 U.S.C. § 371 of International Application No. PCT/KR2019/007005, filed on Jun. 11, 2019, which claims priority from Korean Patent Application No. 10-2018-0067431, filed on Jun. 12, 2018, the disclosures of which are incorporated by reference herein.

TECHNICAL FIELD

The present invention relates to an electrolyte for a lithium secondary battery and a lithium secondary battery including the same, and more particularly, to an electrolyte for a lithium secondary battery having improved battery performance by suppressing a side reaction by a lithium salt, and a lithium secondary battery including the same.

BACKGROUND ART

As personal IT devices and computer networks have been developed due to the development of an information society and thus the society's reliance on electric energy is increased overall, there is a need for the development of a technology for efficiently storing and utilizing electric energy.

Among technologies developed for the above purpose, a secondary battery-based technology is the most suitable technology for various applications. Since a secondary battery may be made small enough to be applied to a personal IT device and the like, and may be applied to an electric vehicle, a power storage device, and the like, there have been growing interests. Among such secondary batteries, a lithium ion battery, which is a battery system having the highest energy density theoretically, is under the spotlight and is currently being applied to various devices.

Unlike in the early days when lithium metal was applied directly to a system, a lithium ion battery system is implemented as a system in which lithium metal is not directly used inside a battery and in which a transition metal oxide material containing lithium is used as a positive electrode material, a carbon-based material such as graphite is applied as a negative electrode material, and an alloy-based material such as silicon is applied as a negative electrode.

Such a lithium ion battery generally includes a positive electrode composed of a transition metal oxide containing lithium, a negative electrode capable of storing lithium, an electrolyte serving as a medium for transferring lithium ions, and a separator. Among the above, the electrolyte is known as a component which greatly affects the stability and safety a battery, and thus, many studies have been conducted thereon.

An electrolyte for a lithium ion battery is composed of lithium salt, an organic solvent for dissolving the lithium salt, a functional additive and the like. In order to improve the electrochemical properties of a battery, the selection of proper components is important. Representative examples of a lithium salt currently used include $LiPF_6$, $LiBF_4$, lithium bis(fluorosulfonyl imide) (LiFSI), $LiN(SO_2F)_2$, lithium bis(trifluoromethanesulfonyl imide) (LiTFSI), $LiN(SO_2CF_3)_2$, lithium bis(oxalate) borate (LiBOB), $LiB(C_2O_4)_2$, and the like, and examples of an organic solvent include an ester-based organic solvent, an ether-based organic solvent, and the like.

In the case of such a lithium ion battery, the increase in resistance and the decrease in capacity during charging/discharging at a high temperature or during storage have been presented as a major problem causing the deterioration in performance. One of the causes of the problem is a side reaction caused by the deterioration of an electrolyte at a high temperature, among other things, the deterioration due to the decomposition a salt at a high temperature. When a by-product of the salt is activated and then decomposes a film formed on the surface of a positive electrode and a negative electrode, there is a problem in that the passivation capability of the film is reduced, thereby causing additional decomposition of the electrolyte and accompanying self-discharge.

Among electrode materials for a lithium ion battery, in the case of a negative electrode in particular, a graphite-based negative electrode is mainly used. The operating potential of the graphite-based negative electrode is 0.3 V (vs. $Li/Li^+$) or less, which is lower than the electrochemical stability window of an electrolyte used in the lithium ion battery, so that an electrolyte currently used is reduced and decomposed on the negative electrode. A product of the reduced and decomposed electrolyte transmits lithium ions, but forms a solid electrolyte interphase (SEI) film capable of suppressing an additional decomposition reaction of the electrolyte.

At this time, when the SEI film is incompletely formed, and thus, an additional decomposition reaction of the electrolyte is not suppressed, the graphite-based negative electrode is self-discharged, so that the electric potential of the entire battery may be lowered.

Accordingly, in order to stably form an SEI film and maintain the same, an additive including a double or triple bond capable of better causing a reduction decomposition reaction may be introduced, or a method in which a decomposition product of a lithium salt generated by heat/moisture in a battery is removed to suppress the damage to the SEI film may be devised.

Meanwhile, one of the causes for damaging the SEI film is a by-product generated by a decomposition reaction of a lithium salt. For example, when $LiPF_6$ is used as a lithium salt, $LiPF_6$ is reduced and decomposed by heat/moisture and the like in a battery to form a by-product such as HF and $PF_5$. Such by-products act as a Lewis acid and may react with a positive electrode active material. At this time, a transition metal is eluted from the positive electrode active material so that the capacity of a battery may be reduced and resistance in the battery may be increased. Also, the eluted transition metal may be electro-deposited on a negative electrode to induce a series of electrolyte decomposition reaction.

Accordingly, research on additives capable of removing by-products generated due to decomposition of a lithium salt is urgently required.

(Patent Document 1) Korean Patent Laid-Open Publication No. 10-2015-0114460

DISCLOSURE OF THE INVENTION

Technical Problem

An aspect of the present invention provides an electrolyte for a lithium secondary battery and a lithium secondary battery including the same, the electrolyte removing a decomposition product of a lithium salt to suppress a side reaction caused by the decomposition product, thereby improving high-temperature safety and capacity properties of the lithium secondary battery.

Technical Solution

According to an aspect of the present invention, there is provided an electrolyte for a lithium secondary battery including a lithium salt, an additive containing a compound represented by Formula 1 below, and an organic solvent.

[Formula 1]

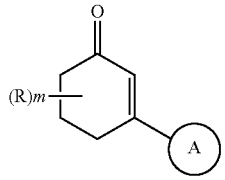

In Formula 1, R is hydrogen or a substituted or unsubstituted alkyl group having 1 to 10 carbon atoms, m is an integer of 0 to 2, and A is a substituted or unsubstituted hetero ring having 4 to 6 carbon atoms and containing a hetero element selected from the group consisting of nitrogen, oxygen, and sulfur.

At this time, the compound represented by Formula 1 above may be a compound represented by Formula 1-1 below.

[Formula 1-1]

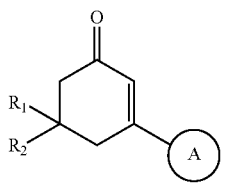

In Formula 1-1, $R_1$ and $R_2$ are each independently selected from the group consisting of hydrogen and a substituted or unsubstituted alkyl group having 1 to 10 carbon atoms, and A is a substituted or unsubstituted hetero ring having 4 to 6 carbon atoms and containing at least one hetero element selected from the group consisting of nitrogen, oxygen, and sulfur.

Meanwhile, A may include a nitrogen as a hetero element.

In addition, A may further include an oxygen as a hetero element.

In one embodiment, the compound represented by Formula 1 above may be one or more selected from the group consisting of a compound represented by Formula 1-2 below and a compound represented by Formula 1-3 below.

[Formula 1-2]

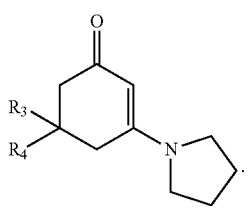

In Formula 1-2, $R_3$ and $R_4$ are each independently selected from the group consisting of hydrogen and a substituted or unsubstituted alkyl group having 1 to 10 carbon atoms.

[Formula 1-3]

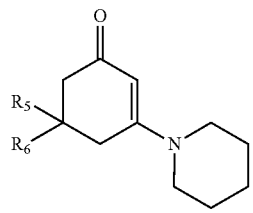

In Formula 1-3, $R_5$ and $R_6$ are each independently selected from the group consisting of hydrogen and a substituted or unsubstituted alkyl group having 1 to 10 carbon atoms.

In another embodiment, the compound represented by Formula 1 above may be a compound represented by Formula 1-4 below.

[Formula 1-4]

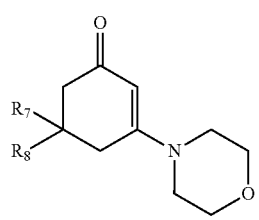

In Formula 1-4, $R_7$ and $R_8$ are each independently selected from the group consisting of hydrogen and a substituted or unsubstituted alkyl group having 1 to 10 carbon atoms.

Meanwhile, the additive may be included in an amount of 0.1 parts by weight to 3 parts by weight based on 100 parts by weight of the electrolyte for a lithium secondary battery.

The lithium salt may include one or more selected from the group consisting of $LiPF_6$ and $LiBF_4$.

According to another aspect of the present invention, there is provided a lithium secondary battery including a positive electrode, a negative electrode, and the electrolyte for a lithium secondary battery.

Advantageous Effects

An electrolyte for a lithium secondary battery according to the present invention includes an additive capable of reacting with a decomposition by-product of a lithium salt, thereby suppressing a side reaction caused by the decomposition by-product of the lithium salt to prevent a self-discharge phenomenon due to the elution of the positive electrode active material, and preventing the increase in resistance in a battery to improve the high-temperature safety and capacity properties of the battery.

BRIEF DESCRIPTION OF THE DRAWING

FIG. 1 is a graph showing the elution amount of a transition metal (Mn) eluted from a positive electrode active material after storing a lithium secondary battery at a high temperature according to Experimental Example 1.

BEST MODE FOR CARRYING OUT THE INVENTION

Hereinafter, the present invention will be described in more detail.

It will be understood that words or terms used in the specification and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

The terminology used herein is for the purpose of describing particular exemplary embodiments only and is not intended to be limiting of the present invention. The terms of a singular form may include plural forms unless the context clearly indicates otherwise.

It will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

<Electrolyte for Lithium Secondary Battery>

An electrolyte for a lithium secondary battery according to the present invention includes a lithium salt, an additive containing a compound represented by Formula 1 below, and an organic solvent.

Lithium Salt

First, the lithium salt will be described.

The lithium salt is one used as an electrolyte salt in a lithium secondary battery, and is used as a medium for transferring ions. Typically, the lithium salt includes $Li^+$ as a cation, and may include, as an anion, at least one compound selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $B_{10}Cl_{10}^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $CH_3SO_3^-$, $CF_3(CF_2)_7SO_3^-$, $CF_3CO_2^-$, $CH_3CO_2^-$, $SCN^-$, and $(CF_3CF_2SO_2)_2N$. Specifically, the lithium salt may include one or more selected from the group consisting of $LiPF_6$ and $LiBF_4$, but is not limited thereto.

The lithium salt may be included at a concentration of 0.1 M to 10.0 M, more preferably 0.5 M to 5.0 M, even more preferably 1.0 M to 3.0 M based on the electrolyte for a lithium secondary battery. When the lithium salt is included in the above range, lithium ions are dissociated to a certain level or greater in the electrolyte, so that the charge and discharge of a battery may be smoothly performed and viscosity may be maintained to a level at which the wetting properties in the battery may be maintained constant.

Additive

Next, the additive will be described. The additive includes a compound represented by Formula 1 below.

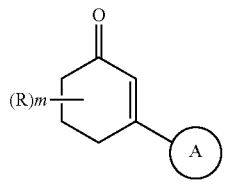

[Formula 1]

In Formula 1, R is hydrogen or a substituted or unsubstituted alkyl group having 1 to 10 carbon atoms, m is an integer of 0 to 2, and A is a substituted or unsubstituted hetero ring having 4 to 6 carbon atoms and containing a hetero element selected from the group consisting of nitrogen, oxygen, and sulfur.

An electrolyte for a lithium secondary battery uses a lithium salt for the conduction of lithium ions. In order to obtain a high transference number of lithium ions and increase solubility, a lithium salt having a large-sized anion is mainly used among lithium salts. Representative examples of such an anion include hexafluorophosphate ($PF_6^-$) or tetrafluoroborate ($BF_4^-$). However, in the case of a lithium salt, the lithium salt may be decomposed by moisture contained in an electrolyte or contained in an electrode and may generate a by-product such as HF. When decomposed at a high temperature, a Lewis acid by-product such as $PF_5$ or $BF_3$ may be formed as a decomposition product.

At this time, the decomposition product of the lithium salt causes a decomposition reaction of an organic solvent such as ethylene carbonate, thereby inducing the deterioration of the electrolyte, or during initial charge and discharge of a battery, reacts with solid electrolyte interphase (SEI) which is a film formed on the surface of a negative electrode or with a passivation film formed on the surface of a positive electrode, thereby deteriorating the performance of the battery.

For example, when $LiPF_6$ is used as a lithium salt, $PF_6^-$, which is an anion, may be thermally decomposed to produce $PF_5$, and a series of following reaction may proceed.

$$LiPF_6 \leftrightharpoons LiF + PF_5$$

$$PF_5 + H_2O \rightarrow POF_3 + 2HF$$

$$POF_3 + H_2O \rightarrow POF_2(OH) + HF$$

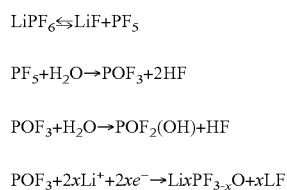

When the above-mentioned reaction proceeds in series, by-products such as HF and $PF_5$ produced during the reaction may cause a decomposition reaction of an organic solvent, and may cause a series of side reactions on a film such as SEI and a passive film formed on the surface of both electrodes.

In addition, by-products such as HF react with a lithium transition metal oxide which is used as a positive electrode active material for a lithium secondary battery to elute transition metal ions. When transition metal ions are eluted, the eluted transition metal ions are electro-deposited on a negative electrode and may destroy an SEI film formed on the surface of the negative electrode, and also, may cause an additional electrolyte decomposition reaction on the SEI film, so that the performance of a battery may be further deteriorated.

At this time, the compound represented by Formula 1 above may act as a Lewis base to remove Lewis acid by-products such as HF and $PF_5$. Accordingly, when an electrolyte using the additive is used, an additional side reaction is prevented from occurring in series, so that battery performance may be improved.

At this time, A may include a nitrogen element as a hetero element and A may further include an oxygen element as a hetero element.

In another embodiment, when A includes a nitrogen as a hetero element, the nitrogen may be located at a site in which the hetero ring is connected.

Oxygen connected by a double bond to a cyclohexenol ring other than A of the compound represented by Formula 1 has properties of pushing electrons. When a nitrogen atom is located at a site connected to the double bond in the cyclohexenol ring, the nitrogen atom having a non-covalent electron pair may further donate electrons to a C=O functional group, thereby strengthening the property of the C=O functional group as a Lewis base. Accordingly, when A includes a nitrogen as a hetero element, it is preferable that the nitrogen is located at a site in which the hetero ring is connected.

For example, the compound represented by Formula 1 above may be a compound represented by Formula 1-1 below.

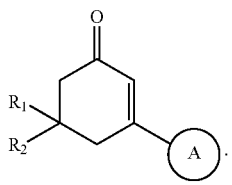

[Formula 1-1]

In Formula 1-1, $R_1$ and $R_2$ are each independently selected from the group consisting of hydrogen and a substituted or unsubstituted alkyl group having 1 to 10 carbon atoms, and A is a substituted or unsubstituted hetero ring having 4 to 6 carbon atoms and containing at least one hetero element selected from the group consisting of nitrogen, oxygen, and sulfur.

For another example, the compound represented by Formula 1 above may be one or more selected from the group consisting of a compound represented by Formula 1-2 below and a compound represented by Formula 1-3 below.

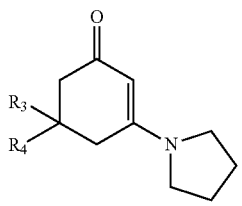

[Formula 1-2]

In Formula 1-2, $R_3$ and $R_4$ are each independently selected from the group consisting of hydrogen and a substituted or unsubstituted alkyl group having 1 to 10 carbon atoms.

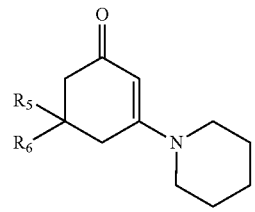

[Formula 1-3]

In Formula 1-3, $R_5$ and $R_6$ are each independently selected from the group consisting of hydrogen and a substituted or unsubstituted alkyl group having 1 to 10 carbon atoms.

For yet another example, the compound represented by Formula 1 above may be a compound represented by Formula 1-4 below.

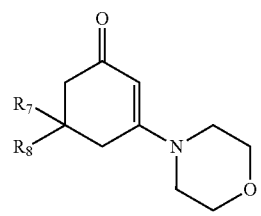

[Formula 1-4]

In Formula 1-4, $R_7$ and $R_8$ are each independently selected from the group consisting of hydrogen and a substituted or unsubstituted alkyl group having 1 to 10 carbon atoms.

Meanwhile, the additive may be included in an amount of 0.1 parts by weight to 5 parts by weight, preferably 0.1 parts by weight to 3 parts by weight, more preferably 0.1 parts by weight to 1 part by weight based on 100 parts by weight of the electrolyte for a lithium secondary battery. When the additive is included in the above range, by-products of a lithium salt may be effectively removed to minimize the deterioration in battery performance and the increase in viscosity, so that the ion conductivity in the electrolyte may be maintained at a predetermined level.

Organic Solvent

Next, an organic solvent will be described.

In the present invention, an organic solvent is a solvent typically used for a lithium secondary battery. For example, an ether compound, an ester compound, an amide compound, a linear carbonate compound, a cyclic carbonate compound, or a nitrile compound may be used alone or in combination of two or more thereof.

For example, as the cyclic carbonate compound, a single compound or a mixture of two or more selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and a halide thereof may be used. Specific examples of the linear carbonate compound may include a compound or a mixture of two or more selected from the group consisting of dimethyl carbonate (DMC), diethyl carbonate (DEC), dipropyl carbonate (DPC), ethyl methyl carbonate (EMC), methyl propyl carbonate (MPC), and ethyl propyl carbonate (EPC).

In addition, as the ester compound, a single compound or a mixture of two or more selected from the group consisting of methyl acetate, ethyl acetate, propyl acetate, methyl propionate, ethyl propionate, γ-butyrolactone, γ-valerolactone, γ-caprolactone, σ-valerolactone, and ε-caprolactone.

Meanwhile, in addition to the above-described components, in order to impart a resistance reduction effect in a battery, the electrolyte for a lithium secondary battery according to an embodiment of the present invention may selectively include other additives known in the art which may implement such physical properties. As the other additives, for example, vinylene carbonate (VC), vinyl ethylene carbonate (VEC), propane sultone, succinonitrile (SN), adiponitrile (AdN), ethylene sulfate (Esa), propene sultone (PRS), fluoro ethylene carbonate (FEC), $LiPO_2F_2$, lithium difluoro(oxalato)borate (LiODFB), lithium bis-(oxalato)borate (LiBOB), 3-trimethoxysilanyl-propyl-N-aniline (TMSPa), tris(trimethylsilyl) phosphite (TMSPi), and the like may be used.

<Lithium Secondary Battery>

Next, a lithium secondary battery according to the present invention will be described. The lithium secondary battery according to an embodiment of the present invention includes a positive electrode, a negative electrode, a separator, and the electrolyte for a lithium secondary battery. Meanwhile, the description of the electrolyte for a lithium secondary battery is the same as that described above, and thus, a detailed description thereof will be omitted.

The positive electrode may be prepared by coating positive electrode active material slurry including a positive electrode active material, a binder, a conductive material, and a solvent on a positive electrode current collector.

The positive electrode current collector is not particularly limited as long as it has conductivity without causing a chemical change in the battery. For example, stainless steel, aluminum, nickel, titanium, fired carbon, or aluminum or stainless steel that is surface-treated with one of carbon, nickel, titanium, silver, and the like may be used.

The positive electrode active material is a compound capable of reversible intercalation and de-intercalation of lithium, and specifically, may include a lithium composite metal oxide containing one or more metals such as cobalt, manganese, nickel or aluminum, and lithium. More specifically, the lithium composite metal oxide may be a lithium-manganese-based oxide (e.g., $LiMnO_2$, $LiMn_2O_4$, etc.), a lithium-cobalt-based oxide (e.g., $LiCoO_2$, etc.), a lithium-nickel-based oxide (e.g., $LiNiO_2$, etc.), a lithium-nickel-manganese-based oxide (e.g., $LiNi_{1-Y1}Mn_{Y1}O_2$ (wherein $0<Y1<1$), $LiMn_{2-z1}Ni_{z1}O_4$ (wherein $0<Z1<^2$), etc.), a lithium-nickel-cobalt-based oxide (e.g., $LiNi_{1-Y2}Co_{Y2}O_2$ (wherein $0<Y2<1$), etc.), a lithium-manganese-cobalt-based oxide (e.g., $LiCo_{1-Y3}Mn_{Y3}O_2$ (wherein $0<Y3<1$), $LiMn_{2-z2}Co_{z2}O_4$ (wherein $0<Z2<2$, etc.), a lithium-nickel-manganese-cobalt-based oxide (e.g., $Li(Ni_{p1}Co_{q1}Mn_{r1})O_2$ (wherein $0<p1<1$, $0<q1<1$, $0<r1<1$, $p1+q1+r1=1$) or $Li(Ni_{p2}Co_{q2}Mn_{r2})O_4$ (wherein $0<p2<2$, $0<q2<2$, $0<r2<2$, $p2+q2+r2=2$), etc.), or a lithium-nickel-cobalt-transition metal (M) oxide (e.g., $Li(Ni_{p3}Co_{q3}Mn_{r3}M_{s1})O_2$ (wherein M is selected from the group consisting of Al, Fe, V, Cr, Ti, Ta, Mg, and Mo, and p3, q3, r3, and s1 are each an atomic fraction of independent elements, and $0<p3<1$, $0<q3<1$, $0<r3<1$, $0<s1<1$, $p3+q3+r3+s1=1$, etc.) and the like, and any one thereof or two or more compounds thereamong may be included.

Among these, due to the fact that the capacity properties and stability of a battery may be increased, the lithium composite metal oxide may be $LiCoO_2$, $LiMnO_2$, $LiNiO_2$, a lithium nickel-manganese-cobalt oxide (e.g., $Li(Ni_{0.6}Mn_{0.2}Co_{0.2})O_2$, $Li(Ni_{0.5}Mn_{0.3}Co_{0.2})O_2$, or $Li(Ni_{0.8}Mn_{0.1}Co_{0.1})O_2$, etc.), or a lithium nickel cobalt aluminum oxide (e.g., $LiNi_{0.8}Co_{0.16}Al_{0.05}O_2$, etc.), and the like. When considering an remarkable improvement effect according to the control of type and content ratio of constituent elements forming a lithium composite metal oxide, the lithium composite metal oxide may be $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$, and the like, and any one thereof or a mixture of two or more thereof may be used.

The positive electrode active material may be included in an amount of 60 wt % to 98 wt %, preferably 70 wt % to 98 wt %, more preferably 80 wt % to 98 wt % based on the total weight of a solid excluding the solvent from the positive electrode active material slurry.

The binder is a component for assisting in bonding between an active material and a conductive material, and bonding to a current collector. Typically, the binder may be included in an amount of 1 wt % to 20 wt %, preferably 1 wt % to 15 wt %, more preferably 1 wt % to 10 wt % based on the total weight of a solid excluding the solvent from the positive electrode active material slurry.

Examples of the binder may include polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene (PE), polypropylene, an ethylene-propylene-diene monomer (EPDM), a sulfonated EPDM, styrene butylene rubber, fluorine rubber, various copolymers thereof, and the like.

The conductive material is a component for further improving the conductivity of a positive electrode active material, and may be included in an amount of 1 wt % to 20 wt %, preferably 1 wt % to 15 wt %, more preferably 1 wt % to 10 wt % based on the total weight of a solid excluding the solvent from the positive electrode active material slurry.

The conductive material is not particularly limited as long as it has conductivity without causing a chemical change in the battery. Examples of the conductive material may include graphite; a carbon-based material such as carbon black, acetylene black, Ketjen black, channel black, furnace black, lamp black, and thermal black; a conductive fiber such as carbon fiber and metal fiber; metal powder such as fluorocarbon powder, aluminum powder, and nickel powder; a conductive whisker such as zinc oxide and potassium titanate; a conductive metal oxide such as titanium oxide; or a conductive material such as a polyphenylene derivative, and the like. Specific examples of a commercially available conductive material may include acetylene black series (products of Chevron Chemical Company), Denka black (product of Denka Singapore Private Limited, Gulf Oil Company, etc.,), Ketjen black, EC series (product of Armak Company), Vulcan XC-72 (product of Cabot Company), and Super P (product of Timcal company).

The solvent may include an organic solvent such as N-methyl-2-pyrrolidone (NMP), and may be used in an amount such that a preferred viscosity is achieved when the positive electrode active material, and optionally, the binder and the conductive agent, and the like are included. For example, the solvent may be included in an amount such that the concentration of a solid including the positive electrode active material, and optionally the binder and the conductive material is 50 wt % to 95 wt %, preferably 55 wt % to 90 wt %, more preferably 60 wt % to 90 wt %.

The negative electrode may be prepared, for example, by coating negative electrode active material slurry including a negative electrode active material, a binder, a conductive material, and a solvent on a negative electrode current collector.

The negative electrode current collector typically has a thickness of 3 μm to 500 μm. The negative electrode current collector is not particularly limited as long as it has high conductivity without causing a chemical change in the battery. For example, copper, stainless steel, aluminum, nickel, titanium, fired carbon, copper or stainless steel that is surface-treated with one of carbon, nickel, titanium, silver, and the like, an aluminum-cadmium alloy, and the like may be used. Also, as in the case of the positive electrode current collector, microscopic irregularities may be formed on the surface of the negative electrode current collector to improve the coupling force of a negative electrode active material, and the negative electrode current collector may be used in various forms of such as a film, a sheet, a foil, a net, a porous body, a foam body, and a non-woven fabric body.

Examples of the negative electrode active material may include one or two or more kinds of negative active materials selected from the group consisting of natural graphite, artificial graphite, a carbonaceous material; a lithium-containing titanium composite oxide (LTO); a metal (Me) such as, Si, Sn, Li, Zn, Mg, Cd, Ce, Ni or Fe; an alloy composed of the metals (Me); an oxide (Meox) of the metal (Me); and a composite of the metal (Me) and carbon.

The negative electrode active material may be included in an amount of 60 wt % to 98 wt %, preferably 70 wt % to 98 wt %, more preferably 80 wt % to 98 wt % based on the total weight of a solid excluding the solvent from the negative electrode active material slurry.

The binder is a component for assisting in bonding between a conductive material, an active material, and a current collector, and may be typically included in an amount of 1 wt % to 20 wt %, preferably 1 wt % to 15 wt %, more preferably 1 wt % to 10 wt % based on the total weight of a solid excluding the solvent from the negative electrode active material slurry.

Examples of the binder may include polyvinylidene fluoride (PVDF), polyvinyl alcohol, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer (EPDM), a sulfonated EPDM, styrene-butadiene rubber, fluorine rubber, various copolymers thereof, and the like.

The conductive material is a component for further improving the conductivity of a negative electrode active material, and may be added in an amount of 1 wt % to 20 wt %, preferably 1 wt % to 15 wt %, more preferably 1 wt % to 10 wt % based on the total weight of a solid excluding the solvent from the negative electrode active material slurry.

The conductive material is not particularly limited as long as it has conductivity without causing a chemical change in the battery. For example, graphite such as natural graphite or artificial graphite; carbon black such as acetylene black, Ketjen black, channel black, furnace black, lamp black, and thermal black; conductive fiber such as carbon fiber and metal fiber; a metal powder such as fluorocarbon powder, aluminum powder, and nickel powder; a conductive whisker such as zinc oxide and potassium titanate; a conductive metal oxide such as titanium oxide; or a conductive material such as a polyphenylene derivative, and the like may be used.

The solvent may include an organic solvent such as water or N-methyl-2-pyrrolidone (NMP), and may be used in an amount such that a preferred viscosity is achieved when the negative electrode active material, and optionally, a binder, a conductive material, and the like are included. For example, the solvent may be included in an amount such that the concentration of a solid including the negative electrode active material, and optionally the binder and the conductive material is 50 wt % to 95 wt %, preferably 55 wt % to 90 wt %, more preferably 60 wt % to 90 wt %.

As the separator, a porous polymer film which has been typically used as a separator, for example, a porous polymer film prepared with a polyolefin-based polymer, such as an ethylene homopolymer, a propylene homopolymer, an ethylene-butene copolymer, an ethylene-hexene copolymer, and an ethylene-methacrylate copolymer may be used alone, or in a laminated form thereof. Alternatively, a typical porous non-woven fabric, for example, a non-woven fabric formed of a glass fiber having a high melting point or polyethylene terephthalate fiber may be used, but the present invention is not limited thereto.

MODE FOR CARRYING OUT THE INVENTION

Hereinafter, the present invention will be described in more detail with reference to specific examples. However, the following examples are merely illustrative of the present invention and are not intended to limit the scope of the present invention. It will be apparent to those skilled in the art that various changes and modifications can be made without departing from the scope and spirit of the invention, and it is obvious that such variations and modifications are within the scope of the appended claims.

EXAMPLES

1. Example 1

(1) Preparing Electrolyte for Lithium Secondary Battery

To a solvent in which ethylene carbonate (EC) and ethyl methyl carbonate (EMC) are mixed in a volume ratio of 3:7 as an organic solvent, $LiPF_6$ was added to 1.2 M so as to prepare 9.9 g of an electrolyte. Thereafter, 0.1 g of a compound (5,5-dimethyl-3-morpholino-2-cyclohexen-1-one) represented by Formula 1-4 was added as an additive to the electrolyte so as to prepare an electrolyte for a lithium secondary battery.

(2) Manufacturing Positive Electrode

With 100 parts by weight of N-methyl-2-pyrrolidone (NMP) which is a solvent, a positive electrode active material, which is $LiMn_2O_4$ (LMO), a conductive material, which is acetylene black, a binder, which is polyvinylidene fluoride (PVDF) were mixed at a weight ratio of 90.0:7.5:2.5 to prepare positive electrode active material slurry. The positive electrode active material slurry was applied to a positive electrode current collector (an Al thin film) having a thickness of 20 μm, dried and then roll pressed to prepare a positive electrode.

COMPARATIVE EXAMPLES

1. Comparative Example 1

An electrolyte for a lithium secondary battery and a positive electrode were prepared in the same manner as in Example 1 except that the additive was not added.

2. Comparative Example 2

An electrolyte for a lithium secondary battery and a positive electrode were prepared in the same manner as in Example 1 except that 0.1 g of cyclohexenone was added instead of 0.1 g of the compound represented by Formula 1-4 as the additive.

EXPERIMENTAL EXAMPLES

1. Experimental Example 1: Measuring Transition Metal Elution Amount

The positive electrode prepared in each of Example 1 and Comparative Examples was immersed in 5 ml of the respective electrolyte for a lithium secondary battery, and was stored in a constant-temperature chamber of a high temperature of 60° C. for 2 weeks. Thereafter, the positive electrode was removed, and a sample obtained by mixing 1 g of the electrolyte for a lithium secondary battery, 1.0 mL of ultrapure water and 1.0 mL of nitric acid was placed in a platinum crucible, followed by heating and drying. The dried sample was dissolved by being added with 1.0 mL of nitric acid and 200 µl of hydrogen peroxide, and then 0.1 µl of an internal standard material was added thereto, diluted with 10.0 mL of ultrapure water, and then subjected to ICP-OES analysis using an Inductively Coupled Plasma Optical Emission Spectroscophotometer (ICP-OES) analyzer. The ICP-OES analysis was performed by measuring the content of a transition metal (manganese, Mn) eluted from the positive electrode in 1 g of an electrolyte which has been stored at a high temperature, and the results according to the analysis are shown in FIG. 1.

Referring to FIG. 1, when compared with Comparative Example 1 and Comparative Example 2, it can be confirmed that Example 1 has a significantly smaller elution amount of the transition metal (manganese, Mn) eluted from the positive electrode active material. It can be determined that this is due to the fact that the additive contained in the electrolyte of Example 1 removed Lewis acid compounds which are decomposition products of the lithium salt, so that the elution of the transition metal from the positive electrode active material was suppressed. On the contrary, in the case of Comparative Example 1, an additive was not used as in Example 1, so that it can be confirmed that the elution amount of the transition material was large. In the case of Comparative Example 2, since the elution of the transition metal was not suppressed unlike in Example 1, the elution amount of the transition metal in the electrolyte was significantly large.

The invention claimed is:

1. An electrolyte for a lithium secondary battery, comprising:
    a lithium salt;
    an additive containing a compound represented by Formula 1 below; and
    an organic solvent:

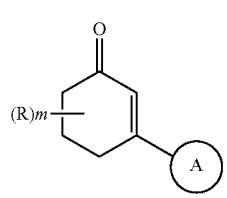

[Formula 1]

wherein, in Formula 1,
    R is hydrogen or a substituted or unsubstituted alkyl group having 1 to 10 carbon atoms, m is an integer of 0 to 2, and
    wherein A is a substituted or unsubstituted hetero ring having 4 to 6 carbon atoms and containing a hetero element selected from the group consisting of nitrogen, oxygen, and sulfur.

2. The electrolyte for a lithium secondary battery of claim 1, wherein the compound represented by Formula 1 is a compound represented by Formula 1-1 below:

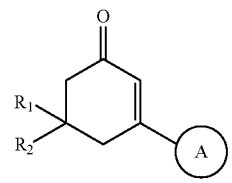

[Formula 1-1]

wherein in Formula 1-1, $R_1$ and $R_2$ are each independently selected from the group consisting of hydrogen and a substituted or unsubstituted alkyl group having 1 to 10 carbon atoms, and
    wherein A is a substituted or unsubstituted hetero ring having 4 to 6 carbon atoms and containing at least one hetero element selected from the group consisting of nitrogen, oxygen, and sulfur.

3. The electrolyte for a lithium secondary battery of claim 1, wherein the at least one hetero element of A comprises nitrogen.

4. The electrolyte for a lithium secondary battery of claim 3, wherein the at least one hetero element of A further comprises oxygen.

5. The electrolyte for a lithium secondary battery of claim 3, wherein the nitrogen is located at a site in A which connects to the remaining portion of the compound represented by Formula 1.

6. The electrolyte for a lithium secondary battery of claim 1, wherein the compound represented by Formula 1 is one or more selected from the group consisting of a compound represented by Formula 1-2 below and a compound represented by Formula 1-3 below:

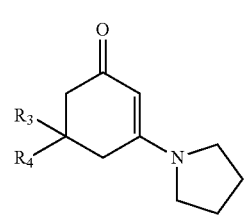

[Formula 1-2]

wherein, in Formula 1-2, $R_3$ and $R_4$ are each independently selected from the group consisting of hydrogen and a substituted or unsubstituted alkyl group having 1 to 10 carbon atoms,

[Formula 1-3]

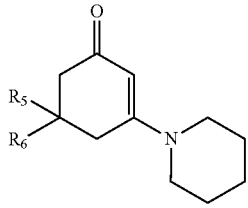

wherein, in Formula 1-3, $R_5$ and $R_6$ are each independently selected from the group consisting of hydrogen and a substituted or unsubstituted alkyl group having 1 to 10 carbon atoms.

7. The electrolyte for a lithium secondary battery of claim 1, wherein the compound represented by Formula 1 is a compound represented by Formula 1-4 below:

[Formula 1-4]

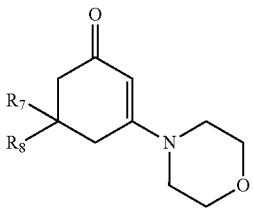

wherein, in Formula 1-4, $R_7$ and $R_8$ are each independently selected from the group consisting of hydrogen and a substituted or unsubstituted alkyl group having 1 to 10 carbon atoms.

8. The electrolyte for a lithium secondary battery of claim 1, wherein the additive is included in an amount of 0.1 parts by weight to 3 parts by weight based on 100 parts by weight of the electrolyte for a lithium secondary battery.

9. The electrolyte for a lithium secondary battery of claim 1, wherein the lithium salt comprises one or more selected from the group consisting of $LiPF_6$ and $LiBF_4$.

10. A lithium secondary battery, comprising:
a positive electrode;
a negative electrode;
a separator; and
the electrolyte of claim 1.

* * * * *

UNITED STATES PATENT AND TRADEMARK OFFICE
CERTIFICATE OF CORRECTION

PATENT NO. : 11,522,224 B2
APPLICATION NO. : 16/771327
DATED : December 6, 2022
INVENTOR(S) : Hyun Seung Kim et al.

It is certified that error appears in the above-identified patent and that said Letters Patent is hereby corrected as shown below:

On the Title Page

Item (72) Inventors: Change "Chui Haeng Lee" to --Chul Haeng Lee--

Signed and Sealed this
Twenty-fourth Day of January, 2023

Katherine Kelly Vidal
Director of the United States Patent and Trademark Office